US009218033B1

(12) United States Patent
Roy et al.

(10) Patent No.: US 9,218,033 B1
(45) Date of Patent: Dec. 22, 2015

(54) ACTIVE PHASE BALANCING AT FACILITY LEVEL

(71) Applicant: Google Inc., Mountain View, CA (US)

(72) Inventors: Richard Roy, Santa Clara, CA (US); Cornelius B. O'Sullivan, Mountain View, CA (US); Taliver Brooks Heath, Mountain View, CA (US)

(73) Assignee: Google Inc., Mountain View, CA (US)

( * ) Notice: Subject to any disclaimer, the term of this patent is extended or adjusted under 35 U.S.C. 154(b) by 491 days.

(21) Appl. No.: 13/651,770

(22) Filed: Oct. 15, 2012

(51) Int. Cl.
*G06F 1/00* (2006.01)
*G06F 1/26* (2006.01)
*H02J 3/26* (2006.01)
*G06F 1/18* (2006.01)

(52) U.S. Cl.
CPC ........ *G06F 1/26* (2013.01); *G06F 1/189* (2013.01); *H02J 3/26* (2013.01)

(58) Field of Classification Search
CPC .............. H02M 1/4216; H02M 2001/0022; G06F 1/189; G06F 1/26; H02J 3/26
See application file for complete search history.

(56) References Cited

U.S. PATENT DOCUMENTS

| 4,143,414 | A | | 3/1979 | Brewster |
| 4,680,689 | A | | 7/1987 | Payne |
| 5,003,453 | A | * | 3/1991 | Tighe et al. ............ 363/65 |
| 7,096,372 | B2 | * | 8/2006 | Sone ................... 713/300 |
| 8,270,188 | B1 | | 9/2012 | Kim |
| 8,385,096 | B2 | | 2/2013 | Yuzurihara |
| 2007/0046103 | A1 | * | 3/2007 | Belady et al. ............. 307/12 |
| 2011/0302440 | A1 | * | 12/2011 | DiMarco et al. ........... 713/340 |
| 2012/0316691 | A1 | * | 12/2012 | Boardman et al. ........... 700/293 |

FOREIGN PATENT DOCUMENTS

| EP | 502096 B1 | 9/1995 |
| EP | 595091 B1 | 5/1998 |

OTHER PUBLICATIONS

Bob Mammano and Mark Jordan, Load Sharing with Paralleled Power Supplies, 16 pages, Texas Instruments Incorporated, 2001, Sep. 1991.

Chunkag and Kamnarn "Parallelling three-phase AC to DC converter using CUK rectifier modules based on power balance control technique" IET Power Electronics 2010, vol. 3(4), pp. 511-524 (www.ietdl.org).

Pan and Liao "Modeling and Control of Circulating Currents for Parallel Three-Phase Boost Rectifiers With Different Load Sharing"IEEE Transactions of Industrial Electronics vol. 55(7), Jul. 2008, pp. 2776-2785.

\* cited by examiner

*Primary Examiner* — Thomas Lee
*Assistant Examiner* — Zhipeng Wang
(74) *Attorney, Agent, or Firm* — Fish & Richardson P.C.

(57) ABSTRACT

A method and apparatus are provided for balancing the load placed by a data center on different phases of a power input. According to the method and apparatus, the load on the power is monitored and a load imbalance detected. Once the load imbalance is detected, a server rack from the data center is selected and a power supply in the selected server rack is reconfigured to output an increased or decreased voltage.

14 Claims, 8 Drawing Sheets

ACTIVE PHASE BALANCING AT FACILITY LEVEL

BACKGROUND OF THE INVENTION

Data centers house large numbers of servers and other communications equipment. An average data center may include thousands of servers and support systems. Their size may give data centers a great demand for electricity, with some data centers exceeding the power usage of small towns. The sheer scale of some data centers' power consumption may cause considerable monetary savings to be realized from even small improvements in energy efficiency. One way to improve the energy efficiency of data centers is to balance the loads which data centers place on different phases of the power signals supplied to them. Such balancing may counter losses due to heat, and it may also increase the efficiency of generators that provide electricity to the data centers.

SUMMARY OF THE INVENTION

In one aspect, a data center is provided including a plurality of servers that are powered using a multi-phase power input received from one or more power sources. The plurality of servers is divided into a plurality of server groups. Each server group includes two or more servers that are not part of any other server group. The data center further includes one or more measuring devices. The one or more measuring devices are configured to identify a characteristic of a load placed on a first phase of the power input by servers from at least two different server groups. The one or more measuring devices are further configured to identify a characteristic of a load placed on a second phase of the power input by servers from at least two different server groups. The managing terminal is further configured to receive, from the one or more measuring devices, a first indication of the load placed on the first phase, receive, from the one or more measuring devices, a second indication of the load placed on the second phase, and detect an imbalance between the load placed on the first phase and the load placed on the second phase. Moreover, the managing terminal is configured to reconfigure a first power supply to output a voltage that is either lower or higher than a voltage output by a second power supply. The first power supply powers the first server group, but not the second server group. The second power supply also powers the first server group, but not the second server group. The first power supply draws current from one of the first phase and the second phase, while the second power supply draws current from the other one of the first phase and the second phase. The power input is a multi-phase power input. In some instances, the first power supply may draw power from a first set of phases and the second power supply may draw power from a second set of phases that is different from the first set.

The managing terminal may be further configured to transmit, over a communication network, a message requesting that the voltage output by the first power supply be changed. The first server group, the first power supply, and the second power supply may further include a power supply control unit operatively connected to both the first power supply and the second power supply and configured to receive, over a communications network, a message of signal requesting that the voltage output by the first power supply be changed. The one or more measuring devices may further measure an amount of current supplied over the first phase. The one or more measuring devices may further measure voltage between the first phase and a reference point.

In another aspect, a method is provided for balancing a power usage of a data center. The method includes measuring loads on at least two phases of a multi-phase power input, the multi-phase power input being used to power a plurality of server racks in the data center. The method further includes detecting that a load placed by the plurality of server racks on a first phase of the power input exceeds a load placed by the plurality of server racks on a second phase of the power input. The method further includes selecting a first server rack from the plurality of server racks. The method further includes reconfiguring a first power supply in the first server rack to output a first voltage that is either lower or higher than a second voltage output by a second power supply that is also a part of the first server rack. The first power supply draws current from one of the first phase and the second phase, while the second power supply draws current from the other one of the first phase and the second phase.

The first server rack may be selected based on a first signal and a second signal. The first signal may be obtained from a first terminal associated with the first server rack and it may indicate an amount of current drawn by one or more devices that are part of the first server rack. The second signal may be obtained from a second terminal associated with the second server rack and it may indicate an amount of current drawn by one or more devices that are part of the second server rack. In some instances, the first server rack may be selected based on the first server rack drawing more power from the power input than the second server rack.

The first terminal and the second terminal may be power supply control units (PSCUs). The first signal may indicate an amount of current drawn by the first server rack. Alternatively, the first signal may indicate an amount of current drawn by the first power supply. Reconfiguring the power supply may further include transmitting a message or signal requesting a voltage output by the first power supply to be changed. The message may further include an indication of the first voltage.

In another aspect, a server rack is provided that includes a first power supply, a second power supply, a plurality of servers, and a control device operatively connected to the first power supply and the second power supply. The first power supply is connected to a first phase of a power signal and the second power supply is connected to a second phase of the power signal. The first power supply outputs a first voltage to a power rail and the second power supply outputs a second voltage to the power rail. Servers in the plurality are configured to draw current from the power rail thereby placing a shared load on the first power supply and the second power supply. The control device is configured to receive, over a communications network, a message requesting a change in the voltage output by the first power supply, and reconfigure the first power supply to begin outputting a third voltage onto the rail, the third voltage being different than the first voltage. The third voltage may be specified in the message.

The control unit may be further configured to determine the second voltage, and determine the third voltage based on the second voltage so that the third voltage is less than the second voltage. The control device may be configured to transmit to a managing terminal, over a communications network, an indication of a load placed on the first phase by the first power supply. Alternatively, the control device may be configured to transmit to a managing terminal, over a communications network, an indication of an amount of current drawn by the server from all phases of the signal.

DETAILED DESCRIPTION

Figure 1:
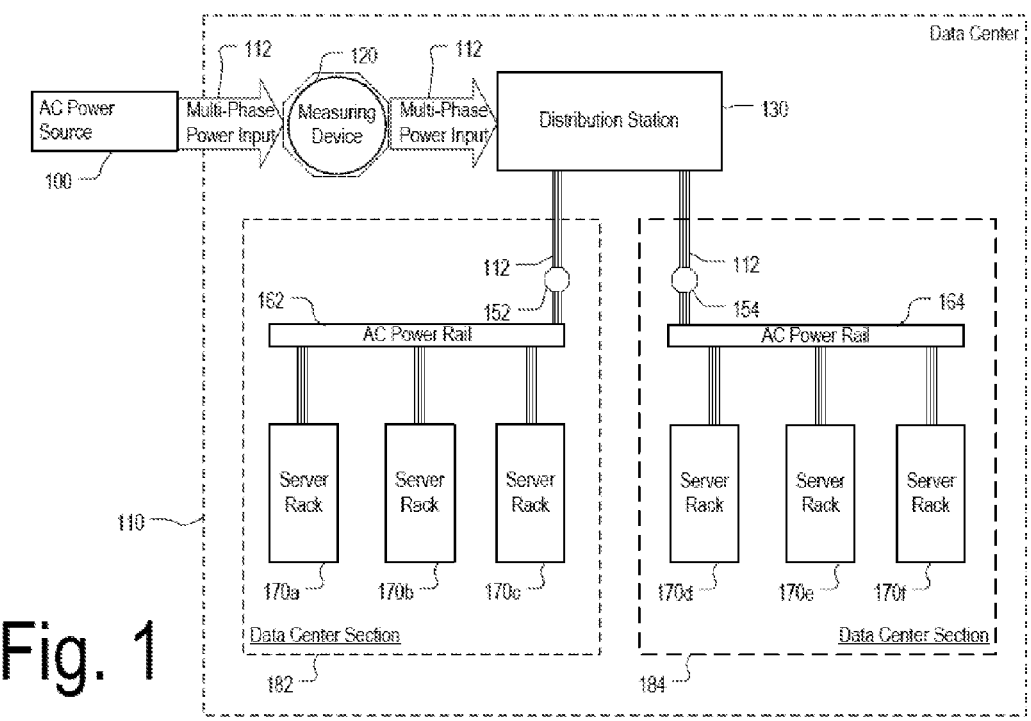
FIG. 1 depicts a schematic diagram of a data center in accordance with aspects of the disclosure.

FIG. 1 depicts a schematic diagram of an exemplary data center 110 that is powered using a power source 100. The power source 100 may be a utility company generator, a backup generator, or any other power source. The power source 100 may provide electricity to the data center 110 via the power signal 112. The power signal 112 may be a three-phase signal having a phase-to-ground RMS voltage of 120V. Distribution station 130 may divide the power signal 112 into subsidiary power signals that are output onto the AC rails 162 and 164. The server racks 170a-f draw power from the AC rails 162 and 164 and use the subsidiary signals to power equipment installed in the server racks. Measuring device 120 may measure the load placed on the signal 112 by the equipment in the server racks 170a-f. The measuring device may be a wattage meter, an amperage meter, or a voltmeter that measures a voltage across one or more phases of the signal 112.

In one alternative example, the measuring device 120 may be placed at one of locations 152 and 154. When placed at these locations, the measuring device 120 may measure one or more characteristics of the load placed on the signal 112 by portions 182 and 184 of the data center 110. Each of the portions 182 and 184 may include one or more devices such as server racks and air conditioners that are part the data center 100. Thus, in some aspects, the measuring device 120 may measure one or more characteristics of the load placed on the signal 112 by only a portion of the data center 110.

Figure 2:
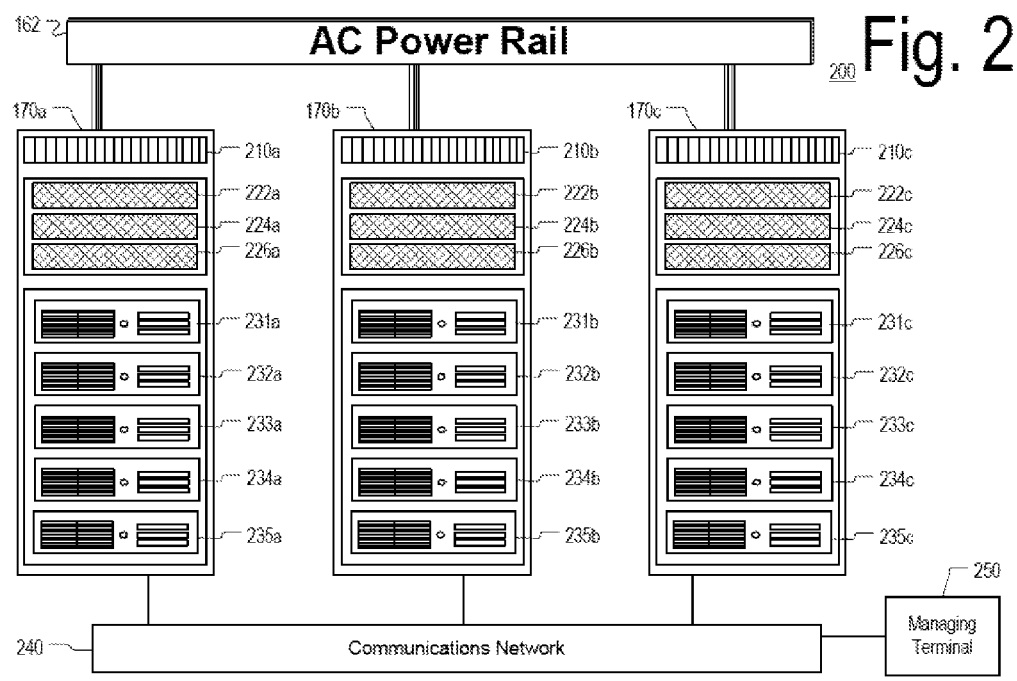
FIG. 2 depicts a schematic diagram of a portion of the data center in accordance with aspects of the disclosure.

FIG. 2 depicts a schematic diagram of a portion 200 of the data center 110. The depicted portion includes the server racks 170a-c, a communications network 240, and a managing terminal 250. The server rack 170a may include a power supply control unit (PSCU) 210a, power supplies 222a-226a, and servers 231a-235a. The PSCU 210a may be an apparatus for controlling the operation of the power supplies 222a-226a. For example, the PSCU may be a rack management unit (RMU), a control board, or any other control device capable of changing the voltage output by the power supplies 222a-226a. The power supplies 222a-226a may be components that provide electric power to devices in the server rack 170a. The servers 231a-235a may include one or more processors, memory, non-volatile storage devices, as well as other components typically found in computer equipment. The power supplies 231a-235a may draw AC current from the AC rail 162, convert the AC current to DC, and feed the DC current the servers 231a-325a. Furthermore, the power supplies 222a-226a may be operatively connected to the PSCU 210a, thereby enabling the PSCU 210a, to set the voltage output by the power supplies 222a-226a.

The server rack 170b may include a PSCU 210b, power supplies 222b-226b, and servers 231b-235b. The PSCU 210b may be an apparatus for controlling the operation of the power supplies 222b-226b. The power supplies 222b-226b may be components that provide electric power to devices in the server rack 170b. The servers 231b-235b may include one or more processors, memory, permanent storage devices, as well as other components typically found in computer equipment.

The server rack 170c may include a PSCU 210c, power supplies 222c-226c, and servers 231c-235c. The PSCU 210c be an apparatus for monitoring and controlling the operation of the power supplies 222c-226c. The power supplies 222b-226b may be components that provide electric power to one or more of the devices in the server rack 170c. The servers 231c-235c may include one or more processors, memory, permanent storage devices, as well as other components typically found in computer equipment.

The network 240 may include a TCP/IP network, 802.11 network, InfiniBand network, or any other type of network. The managing terminal 250 may include hardware and/or software for balancing the load placed on different phases of the signal 112 by the data center 100. In some aspects, the managing terminal 250 may be operatively connected to the PSCUs 210a-c via the network 240. The structure and operation of the managing terminal 250 is further discussed with respect to FIGS. 3-10.

Figure 3:
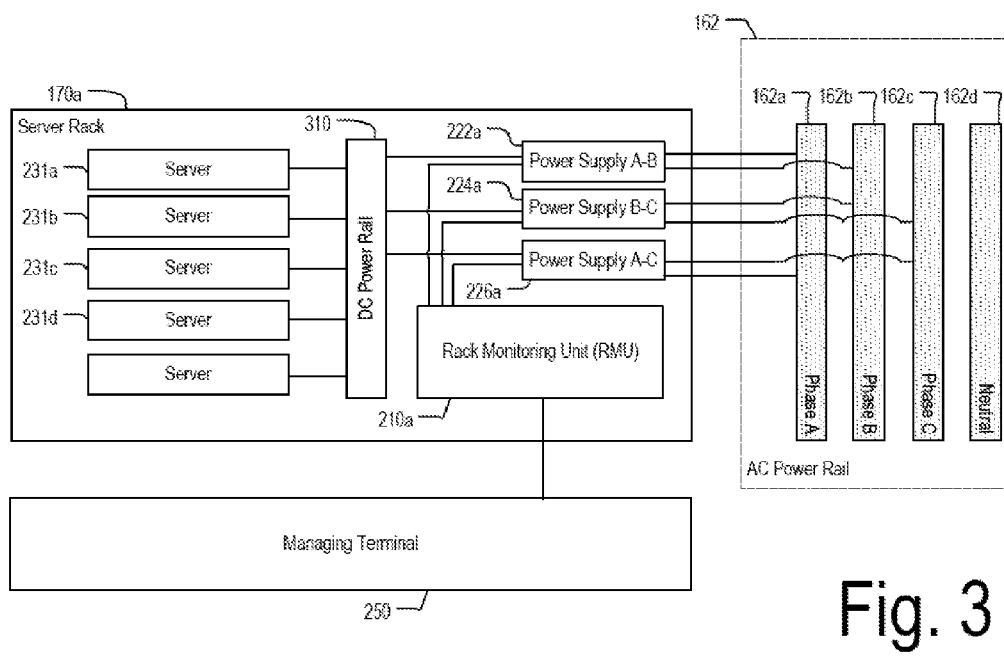
FIG. 3 depicts a schematic diagram of another portion of the data center in accordance with aspects of the disclosure.

FIG. 3 depicts a schematic diagram of a portion 300 of the data center 110 in accordance with aspects of the disclosure. The portion 300 may include the server rack 170a and the AC rail 162. In this example, the AC rail 162 carries 3-phase current supplied by the signal 112 and includes conductors 162a-d. Each of the conductors 162a-d may be a wire, power bus, or another electrically conductive element. In accordance with this example, the conductor 162a carries phase A of the signal 112, the conductor 162b carries phase B of the signal 112, the conductor 162c carries phase C of the signal 112, and the conductor 162d is neutral. In some aspects, the power supplies 222a-226a may be connected to different conductors of the AC rail 162. For example, the power supply 222a may place a load on phase A and phase B, the power supply 224a may place a load on phase B and phase C, and the power supply 226a may place a load on phase A and phase C.

The DC rail 310 may be a wire, a power bus, or any other electrically conductive element. The power supplies 222a-226a may be connected to the DC rail 162. Furthermore, the servers 231a-235a may also be connected to the DC rail 162. In operation, each of the power supplies 222a-226a may receive 120V AC current via the AC rail 162, rectify the received current while converting its voltage level to 50V DC. Afterwards, the 50V DC current is output onto the DC rail 310. The servers 231a-235a, in turn, may draw current from the DC rail 310 in order to power themselves, thereby placing a shared load on the power supplies 222a-226a. Although in this example a Wye connection is used, in other examples a Delta connection may be utilized instead.

Figure 4:
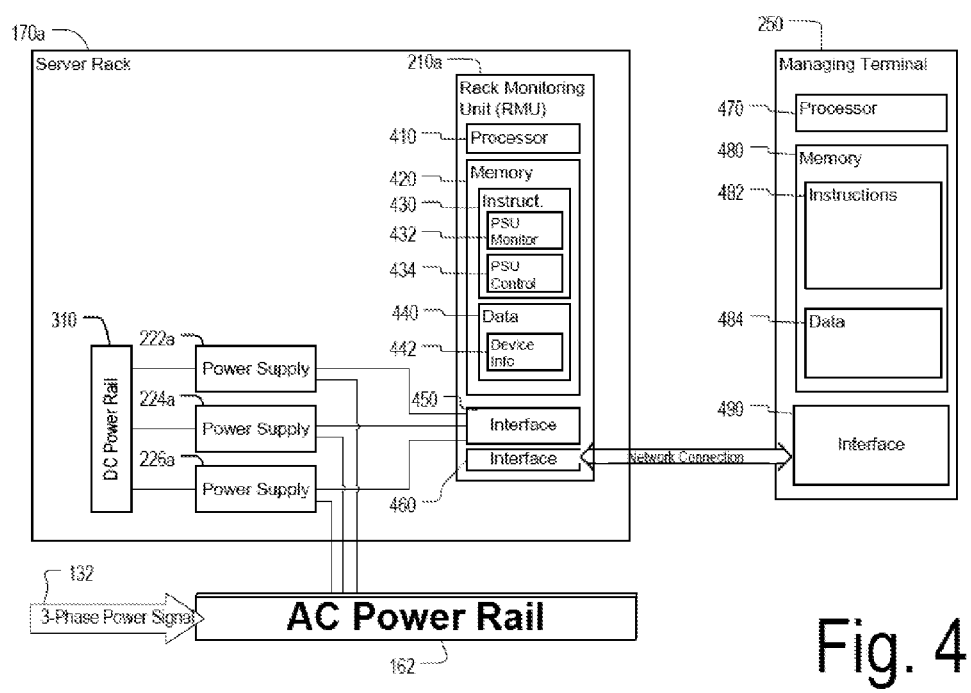
FIG. 4 depicts a schematic diagram of a yet another portion of the data center in accordance with aspects of the disclosure.

FIG. 4 depicts schematic diagram of a portion 400 of the data center 110 in accordance with aspects of the disclosure. The portion 400 may include the managing terminal 250 and the server rack 170a. The server rack 170a may include the PSCU 210, the DC rail 310, and the power supplies 222a-226a. The PSCU 210a may include a processor 410, memory 420, interface 450, and interface 460. The processor 410 may be any available general purpose processor, such as ARM-type processor or x86 processor. Alternatively, the processor 410 may be a special purpose processor, such as a custom FPGA. Although the processor 410 is depicted as a single block, the processor 410 may include any number of processors or processor cores.

The memory 420 may be any volatile or non-volatile memory, such as RAM, ROM, hard-drive, or flash memory, that is capable of storing data and/or processor executable instructions. The instructions 430 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance.

Monitor module 432 may monitor one or more characteristics of the operation of each of the power supplies 222a-226a. For example, the module 432 may determine the voltage output by one or more of the power supplies onto the DC rail 310, amount of current drawn by one or more of the power supplies 222a-226, what phase(s) one or more power supplies are connected to, how much power one or more of the power supplies 222a-226a are drawing from a given phase (e.g., phase A), or any other information relating to the operation of the power supplies 222a-226a. In some aspects, the module 432 may forward the information it obtains to the managing terminal 250. The control module 434 may change the voltage output by each one of the power supplies 222a-226a. For example, the control module 432 may either increase or decrease the voltage which the power supply 222a outputs onto the DC rail 310. Although, the modules 432 and 434 are depicted as being implemented in software, in other examples they may be implemented in hardware or a combination of hardware and software.

Data 440 may be retrieved, stored or modified by the processor 410 in accordance with the instructions 422. For instance, although the disclosure is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data. Device information 442 may be a table that identifies various characteristics of the operation of equipment installed in the server rack 170a. For example, the table may identify amount of current drawn by one or more of the servers 231a-235a, or any other information relating to the operation of the server rack 170a. The table 442 may be stored as a text file, binary file, or any other format. The content of the table 442 may be specified via input from a user.

The interface 450 may include a Bluetooth, USB, TCP/IP, wireless, wired, optical, analog, or any other type of interface. The interface 450 may be connected to one or more of the power supplies 222a-226a. The PSCU 210a may use the interface 450 to receive feedback from the power supplies 222a-226a as well as to transmit one or more control signals to the power supplies 222a-226a for setting the voltage output by the power supplies. The interface 460 may include a TCP/IP interface, InfiniBand interface, or any other type of interface. The interface 460 may be connected, via the network 240, to the managing terminal 250. The network 240 may include a TCP/IP network, 802.11 network, InfiniBand network, or any other type of data network.

The managing terminal 250 may include a processor 470, a memory 480, instructions 482, data 484, and interface 490.

Memory 580 of the managing terminal 250 stores information accessible by the processor 470, including instructions 462 that may be executed by the processor 470. Memory 480 also includes data 464 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 470 may be any well-known processor, such as commercially available processors. Alternatively, the processor may be a dedicated controller such as an ASIC.

The instructions 482 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Data 484 may be retrieved, stored or modified by processor 470 in accordance with the instructions 582. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data. The interface 490 may include a TCP/IP interface, InfiniBand interface, or any other type of interface. The interface 490 may be connected, via the network 240, to the PSCU 210a.

Figure 5:
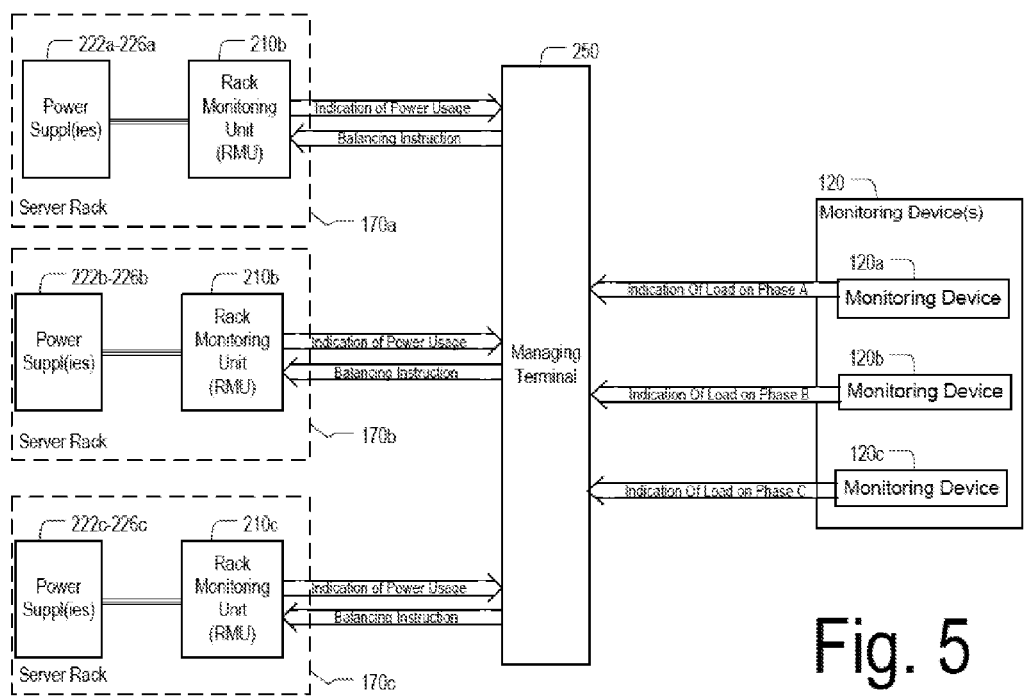
FIG. 5 depicts a schematic diagram illustrating aspects of the operation of the managing terminal of FIG. 4.

FIG. 5 depicts a diagram illustrating the use of the monitoring device 120 by the managing terminal 250. In this example, the monitoring device 120 comprises monitoring modules 120a-c. Each of the monitoring modules 120a-c monitors the load placed by the data center 110 on one of the phases of the power signal 112. Furthermore, the monitoring device 120 may forward measurements taken by the monitoring modules 120a-c to the managing terminal 250. The managing terminal 250 in turn may use the measurements to determine whether a phase-load imbalance exists. When an imbalance is found to exist, the managing terminal 250 may select one of the power supplies based on feedback relating to the operation of the server racks 170a-c. The feedback may be received from the PSCUs 210a-c. Once a power supply is selected, the managing terminal 250 may reconfigure the selected power supply in order to balance out the loads placed on the phases A, B, and C. For example, if the load on phase A is larger than the load on phase B, the managing terminal 250 may reconfigure the selected power supply to draw less power from phase A. The manner in which power supplies are reconfigured is further discussed with respect to FIGS. 6-8.

Figure 6:
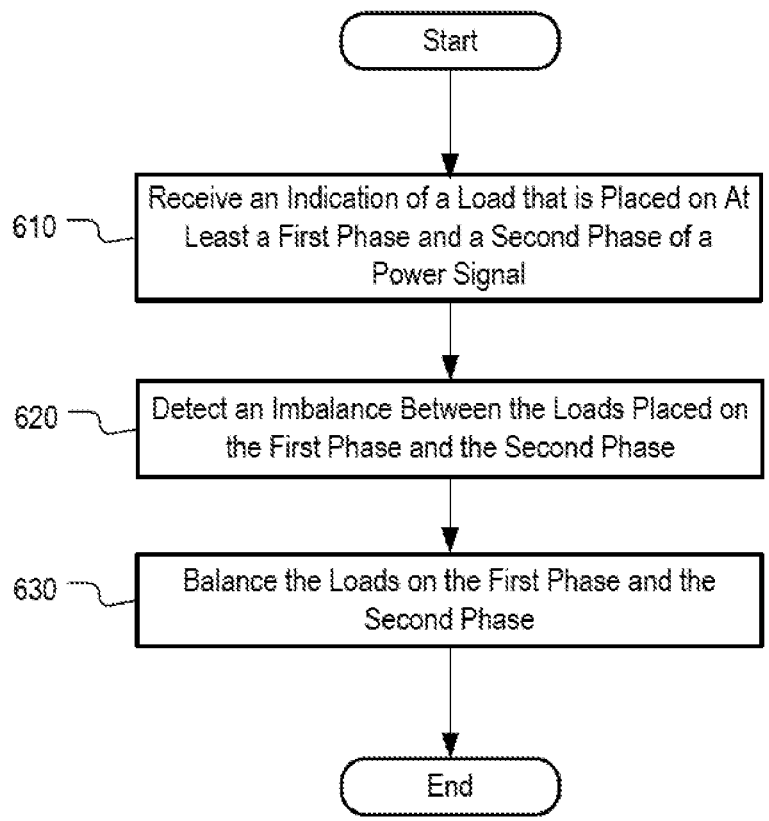
FIG. 6 depicts a flowchart of a process in accordance with aspects of the disclosure

FIG. 6 depicts a flowchart of a process 600 in accordance with aspects of the disclosure. At task 610, the managing terminal 250 receives, from the measuring device 120, an indication of the load placed on phase A and phase B of the signal 112. By way of example, the received indication may identify the amount of current drawn from each one of the phases A and B, phase-to-phase voltages in the signal 112, or the amount of power that is being delivered over each of the phases. At task 620, the managing terminal determines whether a load imbalance exists between the phases A and B.

The precise definition of load imbalance may vary depending on the context in which the PSCU 210*a* is deployed. In some instances, the loads on phases A and B may be considered unbalanced if the amount of current drawn from phase A is more than 5% greater than the amount of current drawn from phase B. In other instances, a load imbalance may be said to exist if the phase A-to-ground voltage of signal 112 is more than 1% greater than the phase B-to-ground voltage of signal 112. The disclosure is not limited to any specific definition of phase-load imbalance. At task 630, the managing terminal 250 balances the loads placed on phases A and B of the signal 112. Task 630 is further discussed with respect to FIGS. 7-8.

Figure 7:
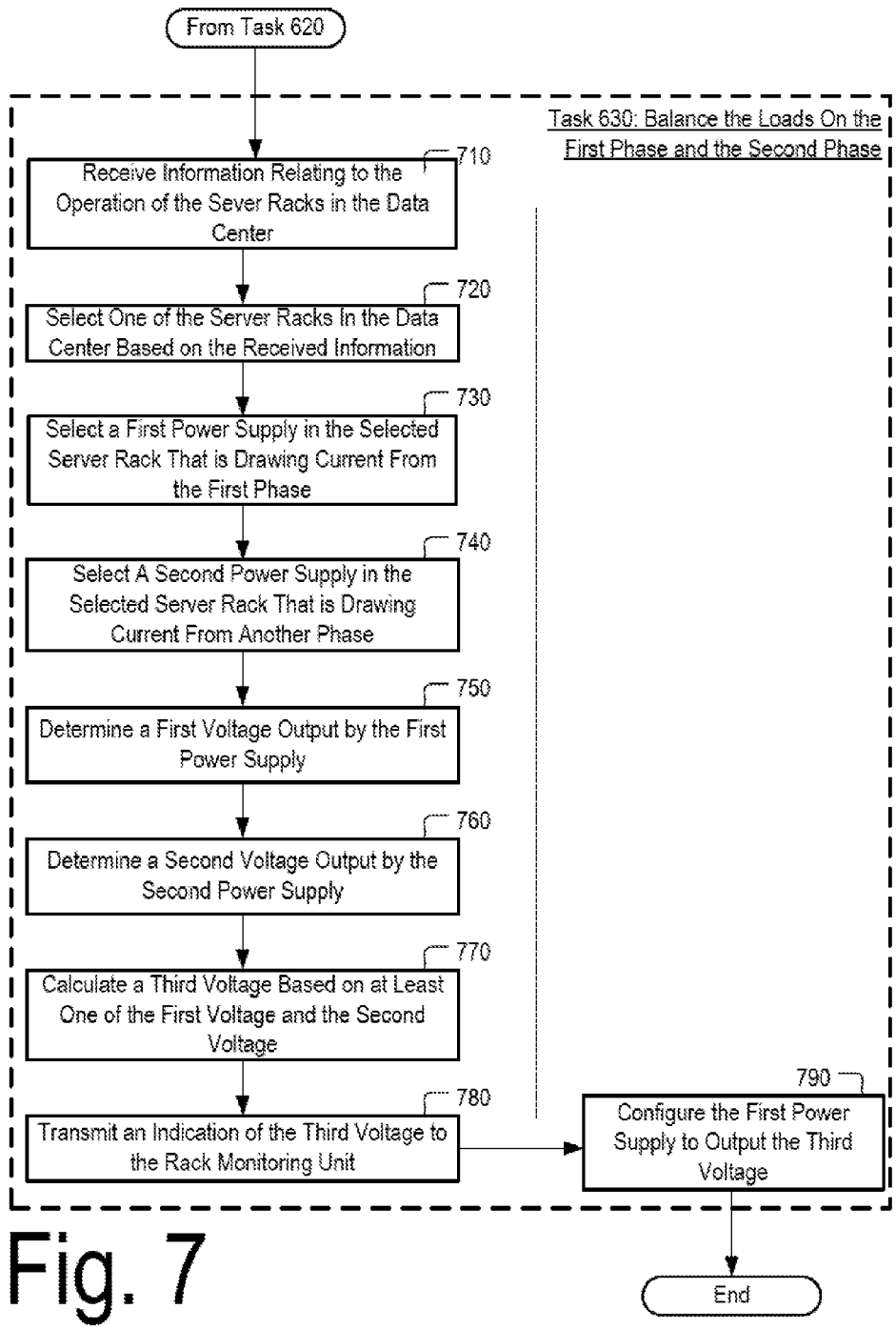
FIG. 7 depicts a flowchart of a process related to the process of FIG. 6.

FIG. 7 depicts a flowchart of an example process associated with balancing the loads on phase A and phase B as specified by task 630 of FIG. 6. At task 710, the managing terminal 250 receives information relating to the operation of the server racks 170*a-f*. By way of example, the received information may include:

C1: Amount of current drawn by a power supply in a server rack.
C2: Amount of current drawn by a power supply in a server rack from a given phase.
C3: Amount of current drawn by a group of power supplies in a server rack (e.g., amount of current drawn by power supplies 222*a*-224*a* or 224*a*-226*a*).
C4: Amount of current drawn from by a group of power supplies in a server rack from a given phase (e.g., phase A).
C5: Amount of power drawn by one or more servers housed a server rack.
C6: Amount of power drawn by all equipment housed in the server rack (e.g., one piece of equipment, some equipment, or all equipment).
C7: Total load placed on a given phase (e.g., phase A) of a power signal by equipment housed in a server rack.

In this example, the information may be transmitted by the PSCUs 210*a-f*. Each of the PSCUs may transmit information relating to the operation of the equipment installed in the same server rack as the PSCU.

At task 720, the managing terminal 250 selects a server rack from the plurality of server racks 170*a-f* based on the information received at task 710. In some aspects, the server rack may be chosen based on a predetermined criterion. For example, the server rack that places the highest (or lowest) total load on a phase that is being balanced (e.g, phase A) may be selected. In the present example, the server rack 170*a* is chosen.

At task 730, the managing terminal 250 selects a first power supply from the server rack 170*a*. The first power supply may be selected based on drawing power from one of the phases whose loads are being balanced (e.g., phase A). In the present example, the power supply 222*a* may be selected.

At task 740, the managing terminal 250 selects a second power supply. The second power supply may be selected based on a predetermined criterion. For example, the second power supply may be selected based on drawing power from another one of the phases that are being balanced (e.g., phase B). As another example, the second power supply may be selected based on the load it places on a predetermined phase (e.g., phase C). For example, the second power supply may be selected based on drawing an amount of power from that phase that exceeds (or falls below) a predetermined threshold. In that regard, the second power supply may be selected based on drawing power from a phase that could pick up load from phase A, or alternatively, be relieved by transferring load from that phase onto phase A. In the present example, the power supply 224*a* may be selected.

At task 750, the managing terminal 250 identifies a first voltage that is output by the first selected power supply on to the DC rail 310. At task 760, the managing terminal 250 identifies a second voltage that is output by the second selected power supply on the DC rail 310. In the present example, the voltages output by the power supplies 222*a* and 224*a* may be communicated to the managing terminal 250 by the PSCU 210*a*.

At task 770, the managing terminal 250 calculates a third voltage to be output by the first selected power supply—namely, the power supply 222*a*. The third voltage may be calculated based on the first and second voltages determined at tasks 750 and 760, respectively. As noted above, the first selected power supply (e.g., the power supply 222*a*) draws power from phase A and the second selected power supply (e.g., the power supply 224*a*) draws power from phase B. In instances where it is desired for phase A to assume load that is carried by phase B, the third voltage may be set higher than the second voltage. Alternatively, in instance where it is desired to relieve the load on phase A by transferring load from phase A to phase B, the third voltage may be less than the second voltage that is output by the power supply 224*a*.

At task 780, the managing terminal 250 transmits an indication of the third voltage to the PSCU 210*a*. At task 790, the PSCU 210*a* receives the indication and reconfigures the power supply 222*a* to output the third voltage. Once the voltage output by the power supply 220*a* is changed, the load placed on each of the phases A, B, and C follows suit. Specifically, when the voltage output by power supply 222*a* is raised above that output by the power supply 224*a*, the power supply 222*a* will attempt supply all of the load current (that is not supplied by the power supply 226*a*) on the DC rail 310 until the current limit of the power supply 222*a* is reached. When the current limit of the power supply 222*a* is reached, its output voltage will start to decline until it equals the voltage output by the power supply 224*a* (or 226*a*), at which point the power supply 224*a* (or 226*a*) will begin supplying some of the current drawn by the server's 231*a*-235*a* from the DC rail 310. By contrast, lowering the voltage output by the power supply 222*a* will have the opposite effect of causing load to be relieved from the phases which the power supply 222*a* draws power from.

Figure 8:
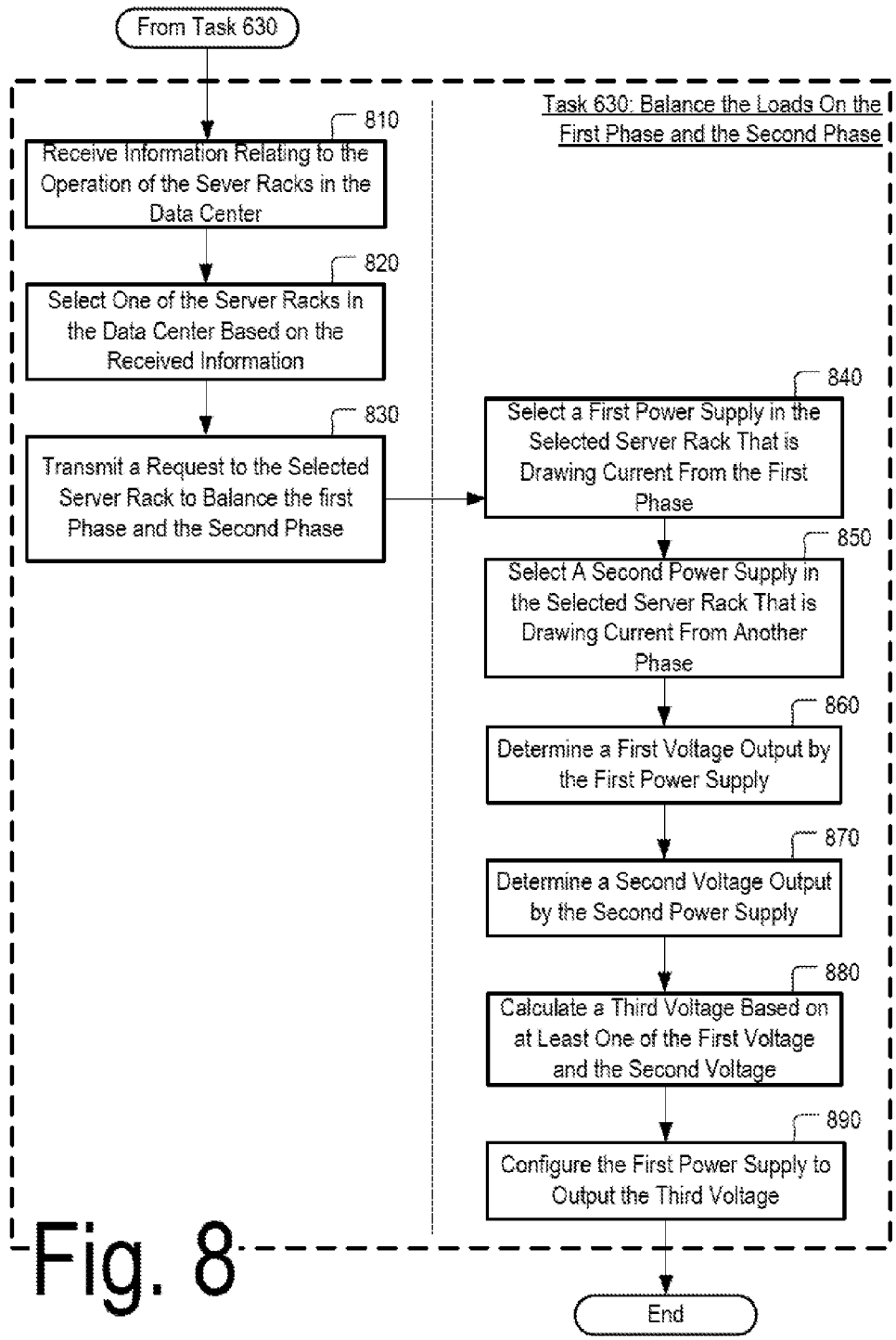
FIG. 8 depicts a flowchart of another process related to the process of FIG. 6.

FIG. 8 depicts a flowchart of a process 800 associated with balancing the loads on Phase A and Phase B as specified by task 630 of FIG. 6. At task 810, the managing terminal 250 receives information relating to the operation of the server racks 170*a-f*. Task 810 is identical to task 710. At task 820, the managing terminal 250 selects a server rack from the plurality of server racks 170*a-f* based on the information received at task 810. Task 820 is identical to task 720. At task 830, the managing terminal identifies the PSCU associated with the selected server rack and transmits a request to that PSCU to balance the load on phase A with the load on phase B. In some aspects, the request may identify the phases to be balanced. (e.g., phase A and phase B). In another aspect, the request may identify an amount of extra load that should be placed on one of the phases (e.g., phase A, phase B). In yet another aspect, the request may specify how much load should be relieved from one of the phases. For example, the request may indicate that 2 A less current should be drawn from phase A. In the present example, the balancing request is transmitted to the PSCU 210*a*.

At task 840, the PSCU 210*a* receives the request and selects a first power supply from the server rack 170*a*. At task 850, the PSCU 210*a* selects a power supply from the sever rack 170*a*. Tasks 840 and 850 are identical to tasks 740 and 750, respectively. At task 860, the PSCU 210*a* determines a first voltage that is output by the first power supply. At task 870, the PSCU 210a determines a second voltage that is output by the second power supply. At task 880, the PSCU calculates a third voltage based on at least one of the first voltage and the second voltage. In some aspects, the third voltage may be calculated by the PSCU 210a in accordance with a preference identified in the request transmitted at task 730 that specifies the amount of load to be relived/added to a given phase. At task 890, the PSCU configures the first power supply to output the third voltage.

FIGS. 3-8 are provided as examples and at least some of the tasks associated with FIGS. 3-8 may be performed in a different order than represented, performed concurrently or altogether omitted. In addition, although in the above examples the first selected power supply is configured to output a different voltage, in other examples the power supply may be reconfigured. Changing the voltage output by either one of the power supply and the first power supply would result in a change in the loads placed on the phases of the signal 112. Furthermore, although in the above examples the power signal 112 is a three-phase signal, in other examples the power signal 112 may include any number of phases. Moreover, although in the above examples the load on a power input is balanced by selecting one of a plurality of server racks and changing the relative voltages output by power supplies used to power servers in the selected rack, in other examples, the load balancing may be achieved by selecting a group of devices out of a plurality of groups, each group having different devices, and changing the relative voltages output by power supplies that power the selected group of devices. The devices in the selected group need not be housed in the same rack. Importantly, the devices can be any type of power consuming devices and not just servers or battery backup systems.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A data center comprising:
 a plurality of servers forming a plurality of server groups, each server group including two or more servers that are not part of any other one from the plurality of server groups, and each sever group powered by a respective first power supply and a respective second power supply in the server group, where each server group has different respective first and second power supplies and is powered only by its respective first and second power supplies, and wherein the first and second power supplies are powered by a multi-phase power input that includes a first phase and a second phase;
 one or more measuring devices configured to identify:
 a characteristic of a load placed on the first phase of the power input by servers from the plurality of server groups; and
 a characteristic of a load placed on the second phase of the power input by servers from the plurality of server groups;
 a managing terminal configured to:
 receive, from the one or more measuring devices, a first indication of the load placed on the first phase;
 receive, from the one or more measuring devices, a second indication of the load placed on the second phase;
 detect an imbalance between the load placed on the first phase and the load placed on the second phase; and
 in response to the detected imbalance, reconfigure, a first server group, a first power supply of the first server group to output to a DC rail in the first server group a DC voltage that is either lower or higher than a DC voltage output to the DC rail in the first server group by a second power supply of the first server group;
 wherein the first power supply draws current from one of the first phase and the second phase, while the second power supply draws current from the other one of the first phase and the second phase; and
 wherein the servers from the first server group are connected to the DC rail and draw power from the DC rail, thereby providing a shared load on the first power supply and the second power supply.

2. The data center of claim 1, wherein the first power supply draws power from a first set of phases and the second power supply draws power from a second set of phases that is different from the first set.

3. The data center of claim 1, wherein the managing terminal is further configured to transmit, over a communication network, a message requesting that the voltage output by the first power supply be changed.

4. The data center of claim 1, wherein:
 the first server group, the first power supply, and the second power supply are part of a server rack; and
 the server rack further includes a power supply control unit operatively connected to both the first power supply and the second power supply and configured to receive, over a communications network, a message or signal requesting that the voltage output by the first power supply be changed.

5. The data center of claim 1, wherein the one or more measuring devices measure an amount of current supplied over the first phase.

6. The data center of claim 1, wherein the one or more measuring devices measure voltage between the first phase and a reference point.

7. A method for balancing a power usage of a data center, the method comprising:
 measuring loads on at least two phases of a multi-phase power input, the multi-phase power input being used to power a plurality of server racks in the data center, each sever rack powered by a respective first power supply and a respective second power supply in the server rack, where each server rack has different respective first and second power supplies and is powered only by its respective first and second power supplies;
 detecting that a load placed by the plurality of server racks on a first phase of the power input exceeds a load placed by the plurality of server racks on a second phase of the power input;
 in response to detecting that the load placed on the first phase of the power input exceeds the load placed on the second phase of the power input:
 selecting a first server rack from the plurality of server racks; and
 reconfiguring a first power supply in the first server rack to output to a DC rail in the first server rack a first DC voltage that is either lower or higher than a second DC voltage output to the DC rail in the first server rack by a second power supply in the first server rack;

wherein the first power supply draws current from one of the first phase and the second phase, while the second power supply draws current from the other one of the first phase and the second phase;

wherein the servers from the first server rack are connected to the DC rail and draw power from the DC rail, thereby providing a shared load on the first power supply and the second power supply; and wherein the first power supply draws power from a first set of phases and the second power supply draws power from a second set of phases that is different from the first set.

8. The method of claim 7, wherein the first server rack is selected based on:

(i) a first signal from a first terminal associated with the first server rack, the first signal indicating an amount of current drawn by one or more devices that are part of the first server rack, and (ii) a second signal from a second terminal associated with the second server rack, the second signal indicating an amount of current drawn by one or more devices that are part of the second server rack.

9. The method of claim 7, wherein the first terminal and the second terminal are power supply control units.

10. The method of claim 7, wherein the first signal indicates an amount of current drawn by the first server rack.

11. The method of claim 7, wherein the first signal indicates a voltage output by the first power supply.

12. The method of claim 7, wherein reconfiguring the power supply comprises transmitting a message or signal requesting a voltage output by the first power supply to be changed.

13. The method of claim 12, wherein the message includes an indication of the first voltage.

14. The method of claim 7, wherein the first server rack is selected based on the first server rack drawing more power from the power input than the second server rack.

* * * * *